(12) United States Patent
Mazor et al.

(10) Patent No.: US 8,295,205 B2
(45) Date of Patent: Oct. 23, 2012

(54) CONTACT MATCHING OF CHANGING CONTENT ACROSS PLATFORMS

(75) Inventors: Gad Mazor, Ramat Efal (IL); Jonathan William Medved, Jerusalem (IL)

(73) Assignee: Vringo, Inc., Beit Shemesh (IL)

( * ) Notice: Subject to any disclaimer, the term of this patent is extended or adjusted under 35 U.S.C. 154(b) by 493 days.

(21) Appl. No.: 12/367,525

(22) Filed: Feb. 8, 2009

(65) Prior Publication Data

US 2009/0203391 A1    Aug. 13, 2009

Related U.S. Application Data

(60) Provisional application No. 61/026,763, filed on Feb. 7, 2008.

(51) Int. Cl.
*H04Q 11/00* (2006.01)
(52) U.S. Cl. ............ 370/259; 370/328; 455/414.1; 709/206; 709/217
(58) Field of Classification Search ............ None
See application file for complete search history.

(56) References Cited

U.S. PATENT DOCUMENTS

| | | | |
|---|---|---|---|
| 7,627,608 B2* | 12/2009 | Strandell et al. | 1/1 |
| 2003/0027112 A1* | 2/2003 | Warneke et al. | 434/167 |
| 2007/0190983 A1 | 8/2007 | Goldfarb et al. | |
| 2008/0133569 A1* | 6/2008 | Vu et al. | 707/102 |
| 2008/0133580 A1* | 6/2008 | Wanless et al. | 707/102 |
| 2008/0222625 A1 | 9/2008 | Goldfarb et al. | |
| 2009/0156181 A1* | 6/2009 | Athsani et al. | 455/414.2 |
| 2009/0164585 A1* | 6/2009 | Ahlin et al. | 709/206 |

* cited by examiner

*Primary Examiner* — Chi H. Pham
*Assistant Examiner* — Shick Hom
(74) *Attorney, Agent, or Firm* — Daniel J. Swirsky; AlphaPatent Associates Ltd.

(57) ABSTRACT

A method includes matching at least one device-associated contact from a list of contacts on a mobile device with at least one web-associated contact from another list of contacts associated with a web-based application and downloading media content associated with the at least one web-associated contact to the mobile device with an indication of the device-associated contact with which it is to be associated. The mobile device launches media content associated with a contact on the occasion of call related activity with the contact.

4 Claims, 7 Drawing Sheets

V Settings

⊙ Please check your phone
We just sent you our application

Step 1
Download client on your phone

Step 2
Check your web page to make sure you see your phone

Step 3
Enter your Personal 4 digit security code that will show here shortly Your phone number is:
( 555 1000 )

Change or remove your phone number

FIG.4

CONTACT MATCHING OF CHANGING CONTENT ACROSS PLATFORMS

CROSS-REFERENCE TO RELATED APPLICATIONS

This application claims benefit from U.S. Provisional Patent Application No. 61/026,763, filed Feb. 7, 2008, which is hereby incorporated in its entirety by reference.

FIELD OF THE INVENTION

The present invention relates to associated media content generally and to synchronizing such media content across different platforms in particular.

BACKGROUND OF THE INVENTION

A ringtone is a sound played on a mobile communication device, e.g. on a mobile cellular phone, to announce an incoming phone call. A ringtone is typically selected by the user of the phone receiving the call. A ringback tone is a sound played on a phone mobile communication device when calling another phone. Typically, the tone is chosen by the owner of the dialed phone. A video ringtone or video ringback tone is similar, but uses a video clip rather than an audio sound.

Prior U.S. patent applications 60/771,883 and 60/772,564, incorporated into U.S. Ser. No. 11/544,938 (now U.S. Pat. No. 7,761,816), define a variation of a video ringtone in which the video clip is chosen by the calling party, to be displayed on the called mobile communication device. These patent applications also disclose a community server (known as the "community server"), an Internet-based server that allows users to choose video clips to be distributed to their friends (or "buddies"). These patent applications discuss a variety of other opportunities to present a video clip. For example at the end of a call between two mobile communication devices, each might see video clip: one chosen by the user of that phone, or one chosen by the user of the other phone, or one chosen by the community server.

Prior U.S. patent application 60/893,647 describes a mobile communication device which downloads clips and associates the clips with their contact in the contact list. The contact list application then displays the clips for calls with the contact.

SUMMARY OF THE INVENTION

There is provided, in accordance with a preferred embodiment of the present invention, a method including matching at least one device-associated contact from a list of contacts on a mobile device with at least one web-associated contact from another list of contacts associated with a web-based application and downloading media content associated with the at least one web-associated contact to the mobile device with an indication of the device-associated contact with which it is to be associated. The mobile device launches media content associated with a device-associated contact on the occasion of call related activity with the device-associated contact.

Moreover, in accordance with a preferred embodiment of the present invention the method includes storing the matches of the device and web associated contacts, determining if the media content has changed for at least one of the contacts and initiating the downloading when at least one media content has changed.

Additionally, in accordance with a preferred embodiment of the present invention, the method also includes providing other content of the web associated contact to a non-contact application on the device.

Further, in accordance with a preferred embodiment of the present invention, the method also includes storing the matches of the device and web associated contacts determining if the other content has changed for at least one of the web-associated contacts and initiating the downloading when the at least one other content has changed.

There is also provided, in accordance with a preferred embodiment of the present invention, a method for a mobile device. The method includes receiving media content of a web-based contact matched to a device-based contact, storing the media content on the device in association with the device-based contact; and launching the media content on the occasion of call related activity with the device-based contact.

Further, in accordance with a preferred embodiment of the present invention, the method also includes receiving other content of the web-associated contact for a non-contact application on the device.

There is also provided, in accordance with a preferred embodiment of the present invention, a contact matching unit. The unit includes a contact matching server, a matched contacts database and a downloader. The contact matching server matches a user's web-associated contacts from a web-based application with device-associated contacts on a mobile device. The matched contacts database stores matched sets of the web-associated and device-associated contacts and the downloader to at least download media content associated with the at least one web-associated contact to the mobile device with an indication of the device-associated contact with which it is to be associated. The mobile device includes a media player to launch media content associated with a device-associated contact on the occasion of call related activity with the device-associated contact.

Additionally, in accordance with a preferred embodiment of the present invention, the unit includes a determiner to determine if the media content has changed for at least one of the contacts and an initiator to activate the downloader when at least one media content has changed.

Further, in accordance with a preferred embodiment of the present invention, the unit includes a provider to provide other content of the web associated contact to a non-contact application on the device.

Still further, in accordance with a preferred embodiment of the present invention, the unit includes a determiner to determine if the other content has changed for at least one of the web-associated contacts and a initiator to activate the downloader when the at least one other content has changed.

There is also provided, in accordance with a preferred embodiment of the present invention, a mobile device including a receiver, a storage unit and a media player. The receiver receives media content of a web-based contact matched to a device-based contact; and the storage unit stores the media content on the device in association with the device-based contact. The media player launches the media content on the occasion of call related activity with the device-based contact.

Finally, in accordance with a preferred embodiment of the present invention, the device includes a non-contact application and a unit to receive other content of the web-associated contact for the non-contact application.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 3, 4, 5 and 6 show the interface with the user of both the mobile device 10 and the information in the web application.

Figure 1:
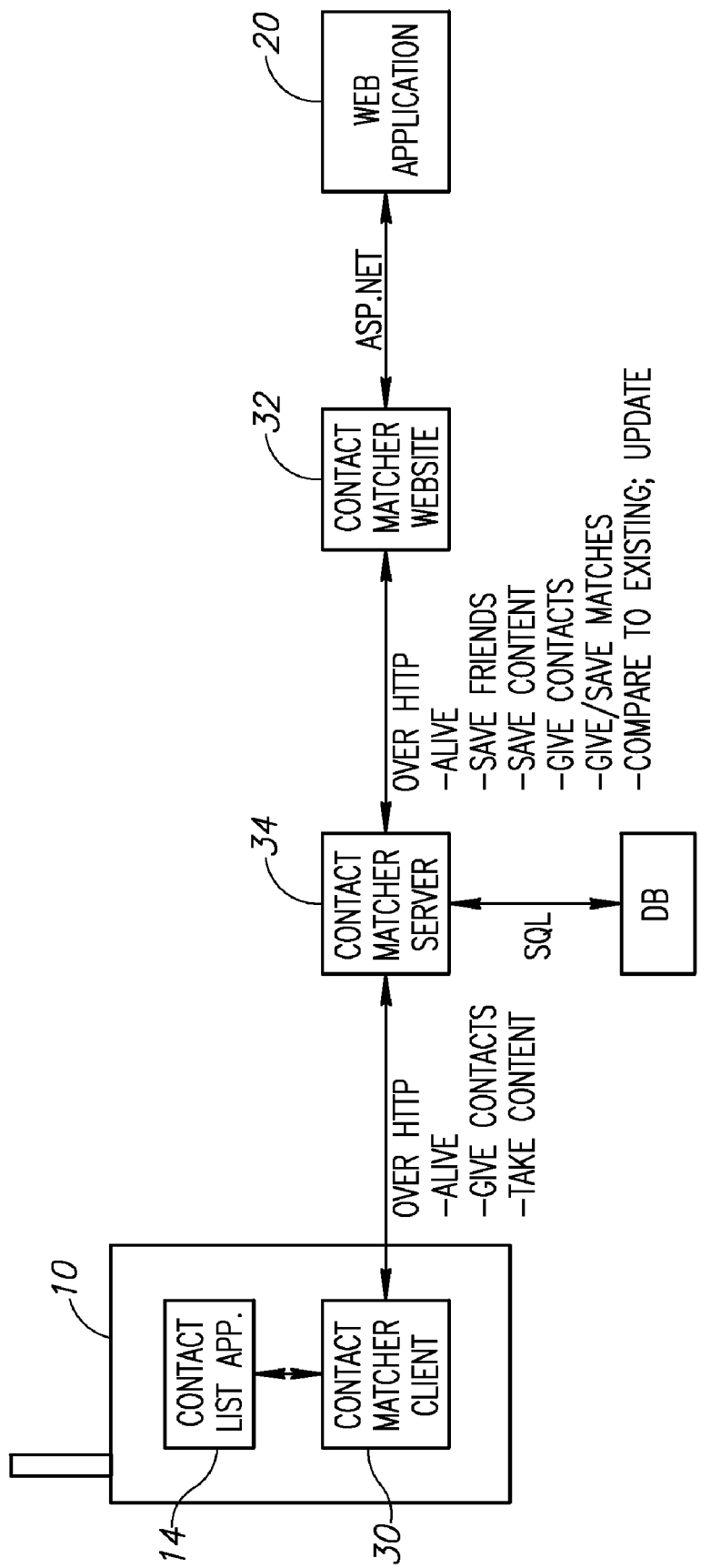
FIG. 1 is a block diagram illustration of a contact matcher, constructed and operative in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that people have contact lists elsewhere, such as in Outlook, Plaxo, etc.; in social network (SN) websites, such as Facebook, LinkedIn and others; and elsewhere. These contact lists not only store the contacts' names, they store other information, such as email addresses, home addresses, alternate telephone numbers, birthdays and, for some, non-contact information such as personal content. For example, Facebook users can upload their photo albums and media clips for others to see. In addition, users can upload a personal identifying photograph to Facebook which Facebook then shows as part of the main information about each person.

Various applications exist to enable users to share their Facebook photos and to send them to their cellphones. For example, mobimii, pix2phone, etc. However, these do not share the identifying profile images. OutSync enables a user to match the Facebook photographs to their contact listings in Microsoft Outlook. The user selects which contacts are updated during an update operation. OutSync then uses Outlook's automatic synchronization features, either by Exchange Server or ActiveSync, to synchronize the photographs to their Windows Mobile devices. The device then displays the photographs during calls and other places where contacts are used. OutSync requires the user to define the match at each and every update.

The present invention may include a contact matcher which may attempt to match the changing items of a contact list on a mobile communication device with a user's friends/contacts/etc. on a web-based application, such as a social utility. For any contact list items which are successfully matched to contacts from the web-based application, the contact matcher may download to the mobile communication device associated media content (photograph or other) which the web-based application uses as part of a profile of the contact. The contact matcher may then provide the media content to the contact list application to add it as part of the information stored for that contact.

For mobile devices which provide media content associated with a contact, once the media content is associated with the contact on the device, the contact list application may provide the media content whenever there is communication with that contact. Thus, a photograph or video originally associated with a contact on the web-based application may be displayed on the mobile communication device when calling to, or when being called by, the contact.

Moreover, each time the contact matcher determines that the content associated with the contact has changed on either the web-based application or the mobile communication device, it may automatically update the other copy (i.e. on the mobile communication device or on the web-based application).

It will be appreciated that the contact list may be any type of contact list, such as Outlook or one which is provided with the mobile device.

FIG. 1, to which reference is now made, illustrates an exemplary contact matching system 100 operating with a mobile communication device 10 and a web application 20. Mobile communication device 10 may come with a contact list application 14 which may maintain a user's address book and may store other information associated with each of the user's contacts. Web application 20 may store another list of the user's contacts, including, for example, friends, acquaintances and/or business contacts.

It will be appreciated that that there may be overlap between the contact list on device 10 and the contact list maintained by application 20. However, the contact lists need not be identical. There may be contacts maintained by web-based application 20 that are not represented on device 10. Similarly, the contact list on device 10 may comprise contacts that are not in the contact list maintained by application 20.

The contact matching system may comprise a contact matcher client 30, a contact matcher website 32 and a contact matching server 34. Website 32 may cooperate with web application 20, such as through ASP.NET, and may receive contact information from web application 20 upon request. Website 32 may provide the information to server 34 which may also receive information from contact matcher client 30. Server 34 may perform the matching and may send client 30 media content associated with contacts stored in contact list application 14. Client 30 may then provide the content to contact list application 14. When device 10 contacts the contact (either by receiving a call from the contact or by calling the contact or by some other means), contact list application 14 may then launch the content associated with the contact.

Figure 2A:
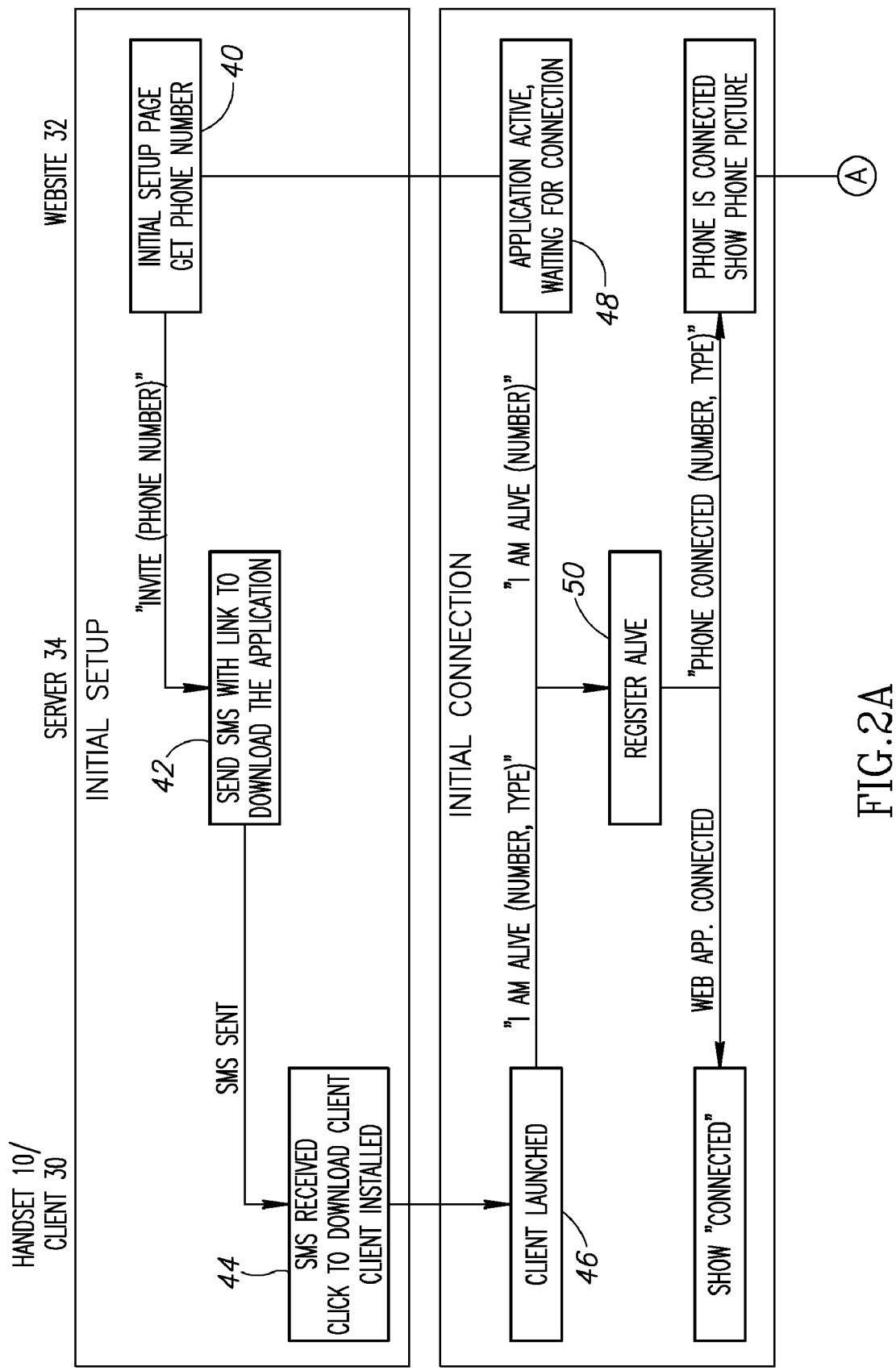
FIGS. 2A and 2B together form a flow chart illustration of the operations of the contact matcher of FIG. 1 in cooperation with a mobile device and a web application.
Figure 2B:
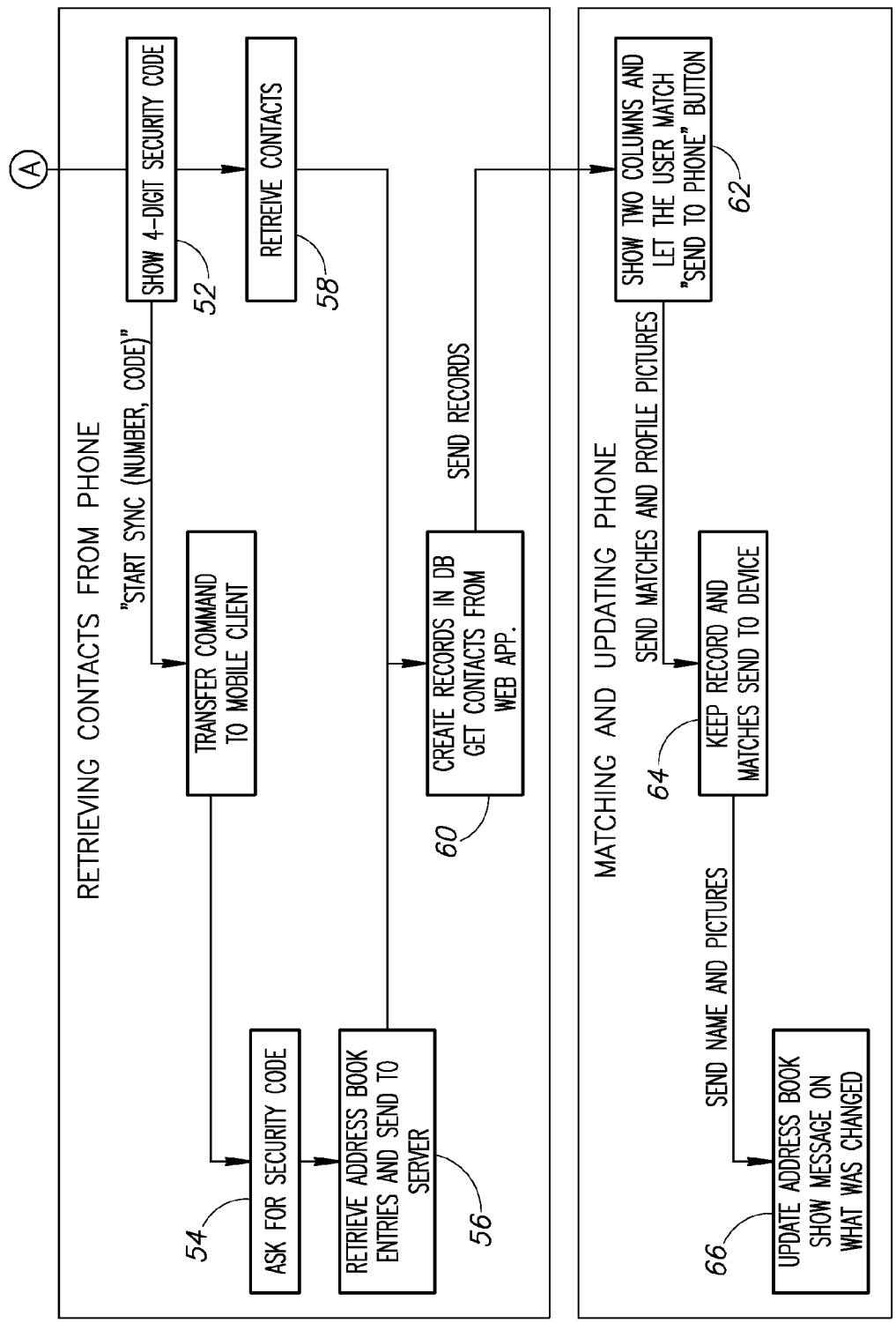

FIGS. 2A and 2B together show the operation flow and FIGS. 3, 4, 5 and 6 may show the interface with the user of both mobile communication device 10 and the information in web application 20.

Figure 3:

Initially, website 32 may prompt (step 40) the user for a phone number associated with mobile communication device 10, through an interface such as is shown in FIG. 3. Server 34 may then send (step 42) an SMS to mobile communication device 10 with a link, such as a URL, from which the user may download (step 44) client 30.

Once client 30 is launched (step 46), client 30 may send an "I am alive" notice to server 34. Such a notice may comprise at least the phone number of mobile communication device 10. Server 34 may set up (step 50) the connection if, within a reasonable amount of time, website 32 also registers (step 48) that it is alive (i.e. that the user associated with that phone number is also logged into web application 20 and thus, information about that user may be received from web application 20). FIG. 4 indicates these operations to the user.

Figure 5:
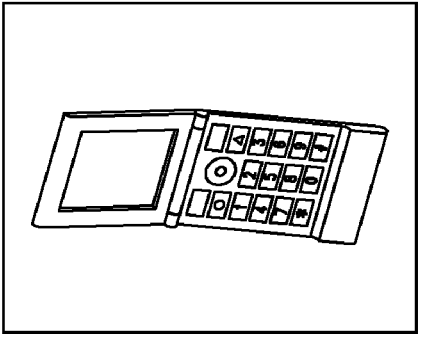

Once both sides are connected, website 32 may display (step 52) a security code to the user and may ask the user to enter (Step 54) it into the phone. This is shown in FIG. 5.

With the code entered, the contact information from both mobile communication device 10 and web application 20 may be passed (steps 56 and 58) to server 34. Server 34 may then attempt to perform the match. In accordance with a preferred embodiment of the present invention, server 34 may provide (step 60) both lists to website 32 to display to the user and may ask the user to match (step 62) their entries, such as through a cursor drag and drop, or by clicking on them individually.

Figure 6:

An exemplary display is shown in FIG. 6, with columns for "Friends Pics", "Contacts From Your Phone" and "Match". The "Friends Pics" column displays the pictures or other media content with the names of the friends, the "Contacts From Your Phone" column displays the names and phone numbers of the contacts and the Match column displays the pictures with the contact information from the phone. Thus, the Match column shows Ben Ben with his picture and his phone number.

Once the matching is finished, server 34 may store the match and may upload (step 64) the content to mobile communication device 10. Client 30 may provide the information to contact list application 14 to update the address book, associating the media content with the contacts. Contact list application 14 may then provide the associated content of a contact whenever device 10 communicates with that contact.

Server 34 may utilize four database tables, as follows:

1. Web info: Associates the user's web_id (i.e. within web application 20) with its associated friends' names.

2. Phone info: Associates the user's phone number with the contact names and phone number(s).

3. Users: associates the user's server id (i.e. within website 32) with his web_id and phone number.

4. Matches: associates the user's server_id with matched web_ids and contact names of his friends. It may also indicate the state of the match (approved, pending, etc).

Once server 34 has a set of matches, it may update the content information. This may generally happen whenever the user logs into his web account and activates website 32. At this point, server 34 may have access to the user's account information in web application 20 and may compare its information with the information it may receive from web application 20. It may update its tables with any content that has changed since the last activation. It may also add new contacts and may delete any that have been removed. Similarly, server 34 may compare its current information with that of device 10 whenever device 10 becomes connected to it and may upload any newly changed content at that point. Thus, the content launched on device 10 for a particular contact may automatically change.

It will be appreciated that other information, gathered by web application 20, may also be exchanged and provided to the other applications which run on mobile communication device 10. For example, web application 20 may gather birthday information. Website 32 may download it to client 30, associated to the contact previously matched. Client 30 may provide the birthdate to a calendar program on mobile communication device 10 which may provide a reminder to the user on the date. Or, it may play birthday music if the user calls the birthday contact on the birthdate. It may add a calendar event or a message event to pop up a message to the user on the birthday to remind him of his friend's birthday.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:

matching at least one device-associated contact from a list of contacts on a mobile device with at least one web-associated contact from another list of contacts associated with a web-based application;

downloading web-based media content associated with said at least one web-associated contact to said mobile device with an indication of the device-associated contact with which it is to be associated, wherein said mobile device launches web-based media content associated with said device-associated contact on the occasion of call related activity with said device-associated contact;

storing matches of said device and said web associated contacts;

determining if said web-based media content has changed for at least one of said web-associated contacts; and initiating said downloading when at least one said media content has changed.

2. A method comprising:
matching at least one device-associated contact from a list of contacts on a mobile device with at least one web-associated contact from another list of contacts associated with a web-based application; downloading web-based media content associated with said at least one web-associated contact to said mobile device with an indication of the device-associated contact with which it is to be associated, wherein said mobile device launches web-based media content associated with said device-associated contact on the occasion of call related activity with said device-associated contact;
providing other web-based content of said web associated contact to a non-contact application on said device;
storing matches of said device and said web associated contacts;
determining if said other web-based content has changed for at least one of said web-associated contacts; and
initiating said downloading when said at least one other content has changed.

3. A contact matching unit comprising:
a contact matching server to match a user's web-associated contacts from a web-based application with device-associated contacts on a mobile device;
a matched contacts database to store matched sets of web-associated and device-associated contacts;
a downloader to at least download web-based media content associated with at least one web-associated contact to said mobile device with an indication of a device-associated contact with which it is to be associated, wherein said mobile device comprises a media player to launch web-based media content associated with said device-associated contact on the occasion of call related activity with said device-associated contact;
a determiner to determine if said web-based media content has changed for at least one of said web-associated contacts; and
an initiator to activate said downloader when at least one said web-based media content has changed.

4. A contact matching unit comprising:
a contact matching server to match a user's web-associated contacts from a web-based application with device-associated contacts on a mobile device;
a matched contacts database to store matched sets of web-associated and device-associated contacts;
a downloader to at least download web-based media content associated with at least one web-associated contact to said mobile device with an indication of a device-associated contact with which it is to be associated, wherein said mobile device comprises a media player to launch said web-based media content associated with said device-associated contact on the occasion of call related activity with said device-associated contact;
a provider to provide other web-based content of said web associated contact to a non-contact application on said device;
a determiner to determine if said other web-based content has changed for at least one of said web-associated contacts; and
an initiator to activate said downloader when at least one of said other web-based content has changed.

* * * * *